United States Patent [19]

Hulland et al.

[11] 4,191,958

[45] Mar. 4, 1980

[54] RADIOLOCATION WITH RESPECT TO AN OWN STATION, USING OMEGA SIGNALS OR THE LIKE

[75] Inventors: Burton L. Hulland, Glenwood Landing; George B. Litchford, Northport, both of N.Y.

[73] Assignee: H & L Co., Glenwood Landing, N.Y.

[21] Appl. No.: 892,832

[22] Filed: Apr. 3, 1978

[51] Int. Cl.² .............................................. G01S 1/30
[52] U.S. Cl. ............................. 343/105 R; 343/112 R
[58] Field of Search ......... 343/112 R, 105 R, 105 LS, 343/103

[56] References Cited

U.S. PATENT DOCUMENTS

| | | | |
|---|---|---|---|
| 3,531,801 | 9/1970 | Huebscher | 343/112 R |
| 3,550,129 | 12/1970 | Steele | 343/112 R |
| 3,754,260 | 8/1973 | Poppe, Jr. et al. | 343/105 R |
| 3,863,257 | 1/1975 | Kang et al. | 343/112 R |
| 3,928,852 | 12/1975 | Barker | 343/112 R |
| 3,987,445 | 10/1976 | Fales; III | 343/112 R |

Primary Examiner—Theodore M. Blum
Attorney, Agent, or Firm—Henry S. Huff

[57] ABSTRACT

Radiolocation, with respect to an Own station, of a transmitter-equipped Other station by triggering the transmitter to transmit identification messages in response to timing signals from a reference source such as an Omega transmitter, receiving the messages and the timing signals at the Own station and comparing them to obtain a line of position of the Other station.

10 Claims, 2 Drawing Figures

RADIOLOCATION WITH RESPECT TO AN OWN STATION, USING OMEGA SIGNALS OR THE LIKE

BACKGROUND

1. Field

This invention pertains to radiolocation of transmitter-equipped stations within the coverage of a source of precisely timed radio signals such as Omega.

2. Prior Art

The long range VLF (very low frequency) navigation system known as Omega has been operational for some time, and is presently being extended to cover the entire globe. Various systems such as differential Omega have been devised to provide relative positional information of improved accuracy in the generally localized area of a reference station that receives the VLF Omega signals both directly and as relayed or rebroadcast from a target or slave station, usually at some higher frequency and without change in format. The direct and relayed transmissions are processed at the reference station to determine the position of the target or slave station with respect to the reference station.

U.S. Pat. No. 3,680,115 describes such a system. The number of relays that can be operated simultaneously is limited by the available frequency spectrum, because each target or slave station requires its own separate relay channel. Moreover, at least three Omega stations are required to obtain an unambiguous fix.

The internationally standardized Air Traffic Control Radio Beacon System (ATCRBS) uses the same carrier frequencies and signal formats throughout the world for cooperation between Secondary Surveillance Radars (SSRs) and airborne transponders. The primary purpose of ATCRBS is to provide ground-based positional information regarding aircraft within the service area of an SSR, for use by traffic controllers.

Transponders are intended to transmit replies only in response to received SSR interrogations. Since a transponder receives interrogations only when a narrow rotating radar beam is pointing at it, it remains silent most of the time, even in a dense radar environment. Occasionally a transponder emits a reply message without interrogation. This is called "squitter" and has little or no effect on the system operation because the SSR sees it as background noise. There is an established maximum permissible squitter rate, much higher than that of the usual transponder.

SUMMARY

According to this invention, a line of position of a transmitter-equipped Other station with respect to an Own station and a reference transmitter of timing signals is determined by receiving the timing signals at both stations, triggering Other's transmitter with the timing signals to transmit identification messages and comparing at Own station the times of arrival of the identification messages and the corresponding timing signals. The difference in time of arrival determines a line of position in the form of an ellipse-like curve with foci at the remote transmitter and Own station. Other lines of position may be determined similarly, or by other techniques such as direction finding, to obtain Other's position with respect to Own.

The timing signals may be the presently existing Omega signals or other suitable phase and frequency-stable signals. They are used to produce, at Own and Other stations, continuous trains of pulses having time relationships to the originally transmitted timing signals that depend on the respective distances of the Own and Other stations from the timing signal transmitter. Other's transmitter may be a standard ATCRBS transponder.

The system transmits no Omega signals, and has no effect on normal operation of Omega. A large number of Other stations can operate in the same service area without interference, because they are triggered non-synchronously and only a small part of the time. For these reasons, and because the transponder triggering can be kept well below the regulation squitter rate maximum, the system cannot interfere with ATCRBS operation. The only added transmissions occur in a non-interfering manner on the ATCRBS reply frequency, requiring no additional frequency assignments.

DRAWING

DESCRIPTION

Figure 1:
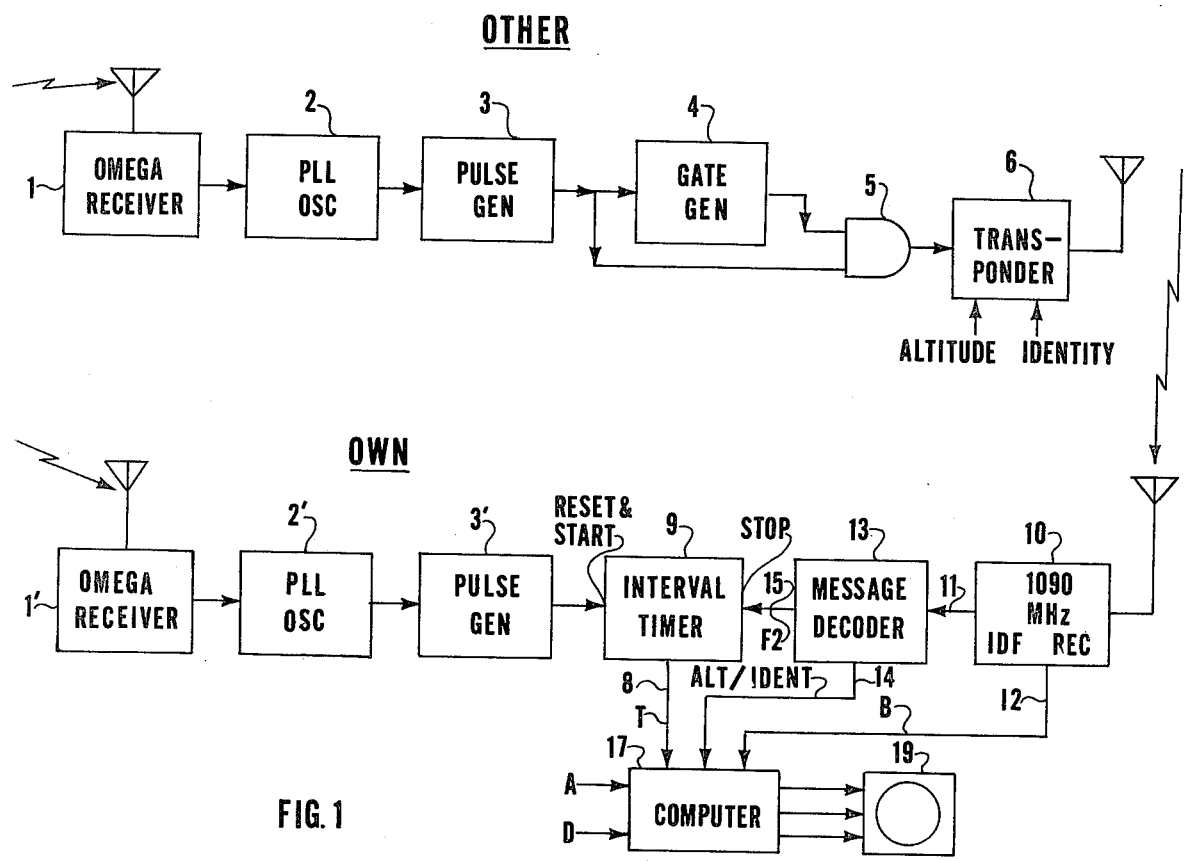
FIG. 1 is a block diagram of a presently preferred embodiment of the invention.

Referring to FIG. 1, the equipment at the Other station, shown at the top, consists of an Omega receiver 1, a phase locked loop controlled oscillator 2, a pulse generator 3, a gate generator 4, an And gate 5 and a transponder 6, cascaded as indicated.

The Omega receiver 1 is a narrow-band audio frequency amplifier, tuned or tunable to select one of the standard Omega frequencies such as 10.2 kHz. The PLL oscillator 2 comprises a voltage controlled oscillator, phase detector and delay network or storage means, all arranged in known manner to function as an extremely narrow band-pass filter with a time constant of about ten seconds, for example.

The pulse generator 3 is designed to produce brief pulses in synchronism with the c-w output of the oscillator 2. The gate signal generator 4 includes a multivibrator designed to produce gate pulses at an average repetition rate of, say 10 per second, somewhat wider than and each approximately centered on one of the pulses from pulse generator 3. To provide the relatively low gate repetition rate, the gate pulse multivibrator may be designed in known manner to require a recovery period of about one tenth second after each gate pulse before it can be triggered by another pulse from pulse generator 3.

Each gate pulse enables And gate 5 to pass a single pulse from pulse generator 3 as a trigger input to the transponder 6. If the trigger line in the transponder is not readily externally accessible, the connection from gate 5 may include an interrogation code generator and a small low powered 1030 MHz transmitter coupled to the transponder antenna or antenna terminal. The interrogation code generator may be like that of an ATCRBS SSR, arranged to elicit altitude and identity messages from the transponder alternately or in some predetermined sequence.

The equipment at Own station, shown in the lower part of FIG. 1, includes an Omega receiver 1', PLL oscillator 2' and pulse generator 3', similar to the correspondingly unprimed numbered elements at Other. Each pulse from pulse generator 3' is applied to the start input terminal of an interval timer 9 which is designed to reset and start in response to each said pulse and stop in response to the next subsequent pulse applied to the stop input terminal, producing an output on line 8 representing the time T between said start and stop pulses.

A 1090 MHz instantaneous direction finder (DF) receiver 10 is adapted to receive transmissions from Other's transponder 6 and determine the bearing B of said transponder. The IDF receiver 10 may be of the type described in U.S. Pat. No. 3,792,472, arranged to provide the transponder message on output line 11 and a representation of the bearing B on output line 12.

Received transponder messages are applied by way of line 11 to decoder 13, which may be similar to the decoder of a conventional ATCRBS radar. Decoder 13 provides an output on line 14 representing the respective identity and/or altitude encoded on each message received, and provides a pulse on line 15 corresponding to a timing mark such as the final framing pulse, or F2 pulse, of such message. Line 14 is connected to the stop input terminal of the interval timer 9.

Lines 8, 12 and 14 supply T, B and identity/altitude inputs to a computer 17, which may be a small general purpose digital computer programmed to perform the functions to be described. Alternatively, computer 17 may be a special purpose assembly of digital elements such as gates and registers partially or wholly hard wired to be dedicated to said functions. The computer is also adapted to receive inputs representing the azimuth A and distance D of a selected Omega transmitter from Own station.

Outputs from the computer 17 are supplied to a display device 19, which may include a cathode ray tube and beam control means arranged in known manner to exhibit the positions and identities of Other stations in a region surrounding Own.

Figure 2:
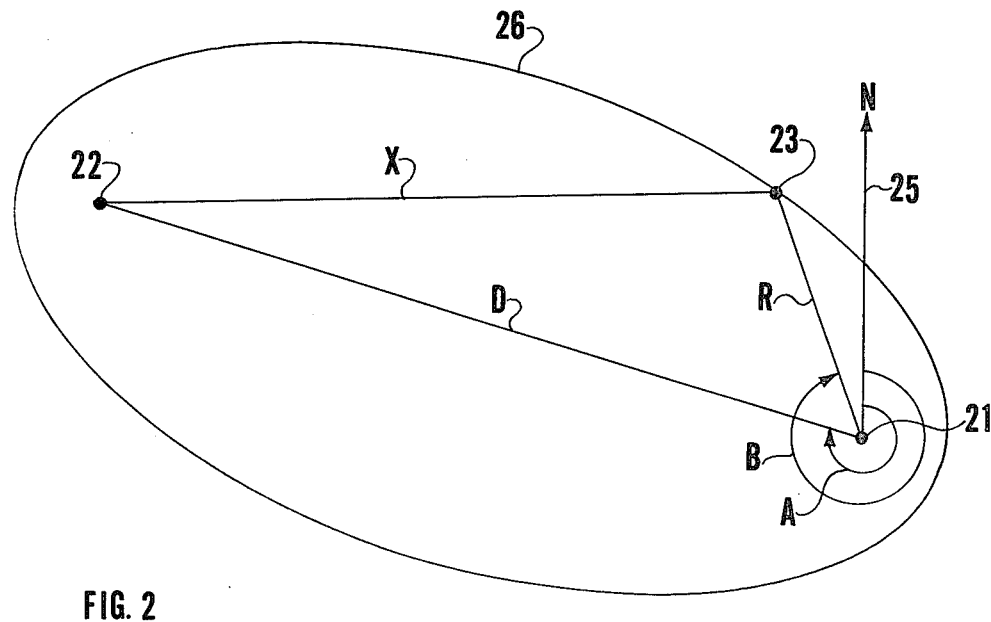
FIG. 2 is a geometrical diagram used in describing the operation of the system of FIG. 1.

Referring to FIG. 2, Own station is located at point 21. A selected Omega transmitter is at point 22, at a known azimuth A and a known distance D from Own. An Other station is at point 23, at a distance R and bearing B from Own. R and B are to be determined. The distance X between the Omega transmitter and Other is also initially unknown. Angles A and B are taken with respect to a reference direction such as North, represented by the arrow 25.

In operation, the Omega transmitter emits recurrent trains of highly stabilized continuous waves at a frequency of 10.2 kHz, for example. Each train is about one second long, and the recurrence period is about 10 seconds. Owing to interference such as that produced by lightning the Omega signals as received at Own and Other stations may vary widely in phase from cycle to cycle. However, the average phase over an extended period such as one second is nearly constant, and depends almost entirely upon the distance from the Omega transmitter. The PLL oscillators 2 and 2' produce c-w outputs at said average phases, corrected as necessary about once every ten seconds. Pulse generators 3 and 3' produce continuous trains of pulses, each pulse occurring in a predetermined time relationship to an output cycle of the respective PLL oscillator 2 or 2'.

About 10 times per second the gate generator 4 produces a gate pulse that enables the And gate 5 to pass one pulse from pulse generator 3 to the transponder 6. This excites the transponder to transmit a message, in standard ATCRBS format, including its preset identity and/or altitude code.

The transponder messages are received by IDF receiver 10, providing bearing information on line 12, and decoded by decoder 13 to provide identity/altitude information on line 14 and a pulse on line 15.

Each pulse from generator 3' resets and starts interval timer 9. Usually the timer runs until reset and started again by the next such pulse, producing no output on line 8. However, when the pulse is followed by a pulse on line 15, the timer produces an output representing the time interval T.

After accounting for systemic delays, such as those introduced by the transponder 6 and the decoder 13, T is the difference in radio travel time from the Omega transmitter to Own station by way of Other, over the distance X+R (see FIG. 2), and directly over the distance D. The systemic delays are compensated in known manner by providing equivalent delays at appropriate locations in the circuitry of the timer 9.

As each transponder message is received by receiver 10, the resulting T, B and message data are temporarily stored in the computer 17 and compared with any remaining previously stored similar data to determine correlation. If several nearly identical sets of data are received within a short time, say one second, it is assumed the data is valid for processing. Uncorrelated and older data are discarded.

The distance X+R is related to the known distance D and the measured interval T as follows:

$$X+R=cT+D.$$

when c is the velocity of radio propagation. This equation defines an ellipse-like curve 26 (FIG. 2) having foci at the points 21 and 22. Curve 26 is a line of position extending through Other's location at point 23. The term "ellipse-like" is used to take account of the fact that the low-frequency propagations over the distances D and X follow approximately Great circles over the Earth's surface rather than straight lines. As a practical matter, this departure from a plane geometrical ellipse may be negligible when Own's and Other's positions are within several tens of miles apart.

The curve 26 represents only one coordinate of the position of point 23; without further information all that is known is that the point is somewhere on the curve. One or more additional lines of position may be obtained in various known manners, for example by similar use of other Omega transmitters. The computer 17 is programmed to solve for the common intersection of such lines of position.

In the present example, a second line of position is Other's bearing, B, which intersects the curve 26 at Other's location at point 23.

The computer 17, provided with inputs representing A, D, T, B, altitude and identity, produces outputs representing R and B, each associated with a particular identity, which are applied to the display device 19 (FIG. 1). The device 19 shows the positions and identities of all suitably equipped Other stations within operational range of Own station.

Other's transponder transmissions caused by SSR interrogations or squitter do not interfere with the operation because they are not synchronous with the Omega signals and do not correlate for validation by the computer.

Although a specific embodiment of the invention has been described, using transmissions from an Omega station and a directional transponder message receiver, various modifications are apparent. For example, transmissions from any stable frequency source such as a television station, Loran, Global Positioning System could be used instead of Omega. Plural timing signal sources at different locations can be used by conventional multiplexing techniques. Transponders other than standard ATCRBS types could be used in the described manner without interference with their originally intended function.

We claim:

1. The method of determining a line of position of a transmitter-equipped Other station with respect to an Own station, comprising the steps of
   (a) receiving at both stations a repetitive timing signal from a reference transmitter at a known location,
   (b) generating at each station a continuous train of brief pulses in fixed time relationship to said timing signals as received,
   (c) selecting single pulses at intervals from said pulse train at said Other station, said intervals being substantially longer than the pulse repetition period of said train,
   (d) triggering the transmitter at said Other station with said selected pulses to transmit messages in fixed time relationship to said selected pulses,
   (e) receiving said messages at said Own station,
   (f) measuring at said Own station the time delay of a predetermined timing mark in each received message with respect to the next preceding pulse of said continuous train, and
   (g) producing from said measurement a representation corresponding to a line of position of said Other station as a specific curve having a focus at said Own station.

2. The method set forth in claim 1, including the additional steps of
   (h) determining at least one other line of position of said Other station with respect to said Own,
   (i) computing the common intersection of said lines of position, and
   (j) producing a representation of the location of said intersection as the position of said Other station with respect to that of said Own station.

3. The method set forth in claim 2, wherein said step (h) consists of measuring the bearing B of said Other station from said Own station.

4. The method set forth in claim 2, wherein said step (h) consists of performing said steps (a) through (g) with timing signals received from one or more other reference transmitters at respective known locations.

5. Apparatus for determining a line of position of an Other station with respect to an Own station, comprising
   (a) means at each of said stations for receiving a repetitive timing signal from a reference transmitter at a known location,
   (b) means at each of said stations for generating a continuous train of brief pulses in fixed time relationship to said timing signals as received,
   (c) a transmitter at said Other station,
   (d) means at said Other station for selecting single pulses at intervals from said train, said intervals being substantially longer than the pulse repetition period of said train,
   (e) means responsive to said selected pulses to trigger said last mentioned transmitter to transmit messages in fixed time relationship to said selected pulses,
   (f) means at said Own station for receiving said messages,
   (g) means at said Own station for measuring the time delay of a predetermined timing mark in each received message with respect to the next preceding pulse of said continuous train, and
   (h) means at said Own station for producing from said measurement a representation corresponding to a line of position of said Other station as a specific curve having a focus at said Own station.

6. The apparatus claimed in claim 5, further including at said Own station
   (i) means for determining at least one other line of position of said Other station with respect to said Own station,
   (j) means for computing the common intersection of said lines of position; and
   (k) means for producing a representation of the location of said intersection as the position of said Other station with respect to that of said Own station.

7. The apparatus claimed in claim 6, wherein said means (i) comprises means for measuring the bearing B of said Other station from said Own station.

8. The apparatus claimed in claim 6, wherein said means (i) includes means for receiving timing signals from one or more other reference transmitters at known locations.

9. The apparatus claimed in claim 5, wherein said means (a) are Omega receivers.

10. The apparatus claimed in claim 5, wherein said means (c) is the transmitter of a standard ATCRBS transponder.

* * * * *